May 11, 1937.  C. C. CALKINS  2,080,112
VEHICLE ROCKING MACHINE
Filed Feb. 15, 1933  3 Sheets-Sheet 1
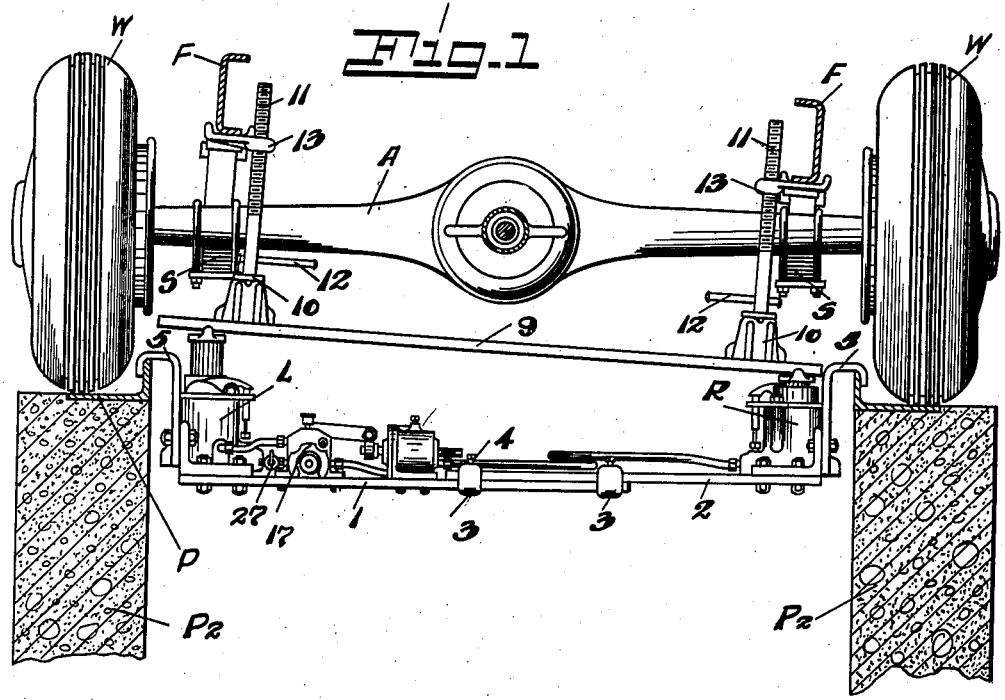
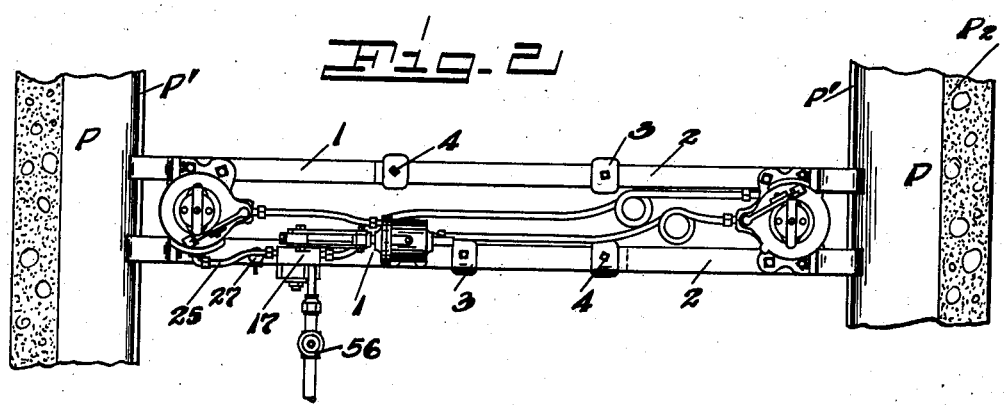
CLAUDE C. CALKINS
Inventor
By Herbert E. Smith
Attorney

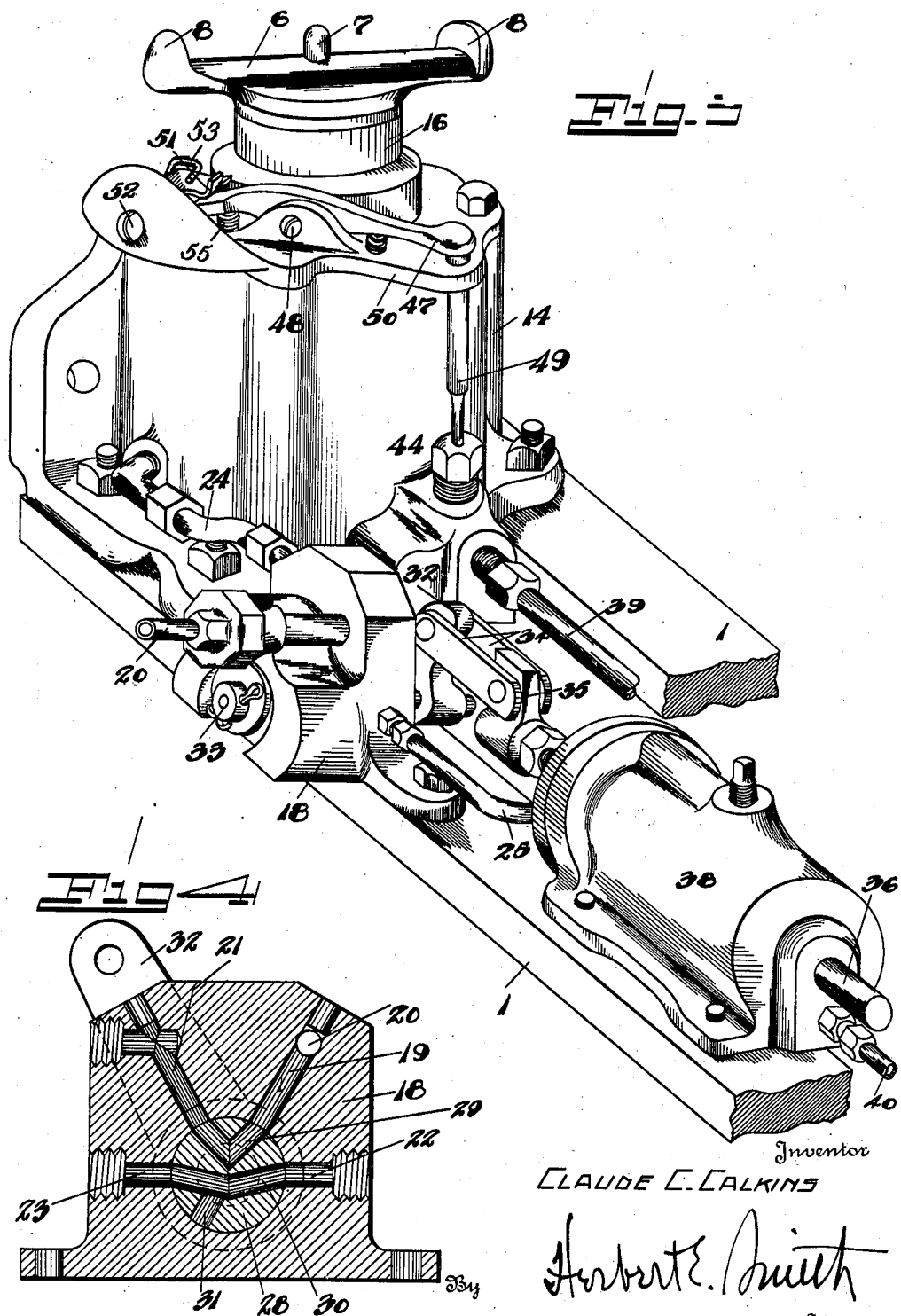

May 11, 1937.  C. C. CALKINS  2,080,112
VEHICLE ROCKING MACHINE
Filed Feb. 15, 1933  3 Sheets-Sheet 3
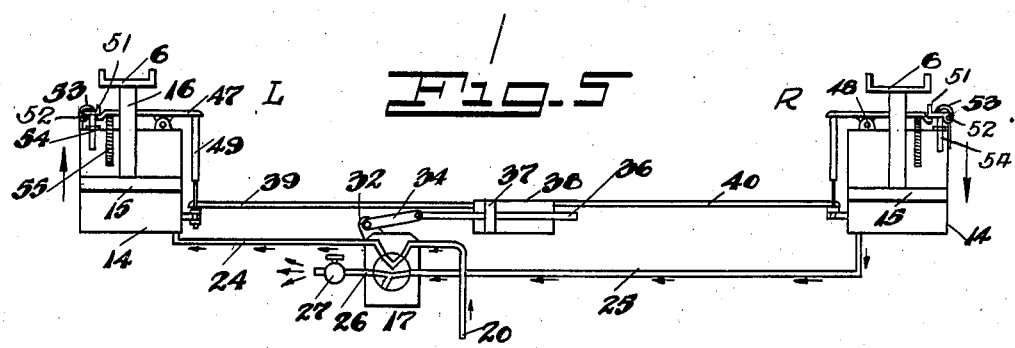
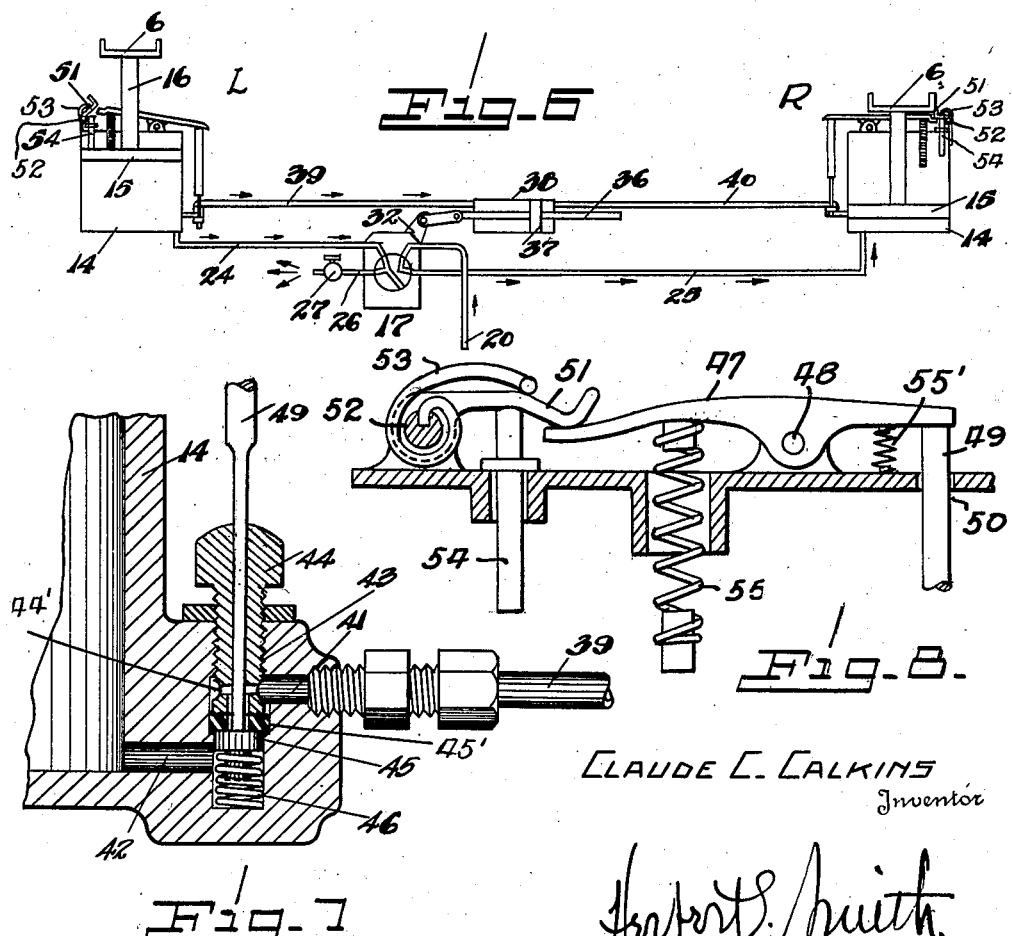

Patented May 11, 1937

2,080,112

UNITED STATES PATENT OFFICE 2,080,112

VEHICLE ROCKING MACHINE

Claude C. Calkins, Spokane, Wash.

Application February 15, 1933, Serial No. 656,941

1 Claim. (Cl. 121—3)

My present invention relates to an improved vehicle rocking machine especially adapted for use with automotive vehicles to facilitate the operations of greasing and lubricating, and for the inspection of parts of the vehicle. By the employment of the apparatus of my invention the weight of the vehicle body and frame is first lifted from the springs and wheels of the vehicle, leaving the wheels and propulsion mechanism in usual condition and position, while the body and frame, thus supported, may readily be rocked laterally, within limits. Thus, in carrying out my invention, the car or vehicle is automatically and mechanically swayed, or laterally rocked for the purpose of loosening the "frozen" greased joints, and to enable the detection, by sound, of body squeaks and other noises that indicate the need for grease or lubricant, and, of course, these parts may then readily be lubricated.

The apparatus of my present invention is specially adapted for use at the top of the pit that is usually found at service stations for automobiles, and the apparatus is provided with means whereby it may quickly and conveniently be adjusted to the width of the pit for its support, and also adjusted to automobiles having main frames of varying dimensions, in order that the apparatus may provide a solid or firm support for the car.

In the present form of my invention, as illustrated in the drawings, I employ a pair of spaced screw jacks, or manually operated jacks, for lifting the weight of the body and frame from the springs of the car, and below these jacks are located a pair of spaced, pneumatic motors, forming part of the supporting apparatus, a jack and a motor being located at each side of the longitudinal center of the automobile or car. These pneumatic motors are alternately operated to lift one side of the car while the other side is being lowered for the accomplishment of the rocking motion of the car. The operating means involved in this invention is designed for use with the machine disclosed in my co-pending application for Patent No. 638,337, filed October 18, 1932. A servo-motor, or pneumatic power cylinder, and a three-way distributing valve are located between the operating motors and in communication therewith, and the supply of compressed air, or other motive fluid, flows to the valve, thence to an operating motor, and at a predetermined interval, the motive fluid is admitted to the servo-motor. The servo-motor is then operated to actuate the distributing valve which cuts off the supply of air to one operating motor and furnishes the supply of air to the other operating motor. The servo-motor and the distributing valve thus control the supply of motive fluid to the two operating motors, and the latter are vented, through the distributing valve, to vent or exhaust the spent power from an operating motor, thereby permitting the latter, while yet supporting one side of the car, to be lowered while the other side of the car is being lifted.

The invention consists in certain novel combinations and arrangements of parts as will be hereinafter more specifically set forth and claimed. In the accompanying drawings I have illustrated one complete example of the physical embodiment of my invention wherein the parts are combined and arranged according to one mode I have thus far devised for the practical application of the principles of my invention, but it will be understood that the exemplified structure may be altered, and various changes made, within the scope of my claim, without departing from the principles of my invention.

Figure 1 is a view showing the apparatus in elevation, and showing the main frame of a car in section, one side of the frame being raised or lifted to illustrate the tilting or rocking action of the main frame and body of the car; and the view also shows the rear axle and rear wheels in usual position above the pit.

Figure 2 is a top plan view of the pneumatic apparatus, with the manual screw jacks omitted for convenience of illustration.

Figure 3 is a perspective view of one of the operating motors, showing also the distributing valve, the power cylinder or servo-motor, and connections between these parts.

Figure 4 is an enlarged detail sectional view of the 3-way distributing valve, the ports being arranged as in Figure 5 to supply power to the left hand operating motor, and to vent the right hand operating motor.

Figure 5 is a diagrammatic view in elevation of the pneumatically operating parts of the apparatus, with arrows showing circulation of the motive fluid with power to the left hand motor and venting the right hand motor.

Figure 6 is a view similar to Figure 5 with the controlling valve in reverse position, showing by the arrows, the flow of motive fluid to the servo-motor and to the right hand operating motor, and showing the venting action of the left hand operating motor.

Figure 7 is a detail sectional view, enlarged, of one of the two valves for controlling the servo-motor or power cylinder.

Figure 8 is a detail view, partly in section, showing the venting-valve and its operating means.

In order that the general relation and utility of parts may readily be understood I have shown in Figure 1 the rear wheels W, the main frame F, the rear axle A, and springs S of an automobile, the wheels resting upon angle plates P having vertical flanges P' and located at the top of the opposite walls P2 of the usual pit, found at service stations for automobiles. It will be understood from an inspection of Figure 1 that the Frame F, and parts above the frame, are rocked laterally, for the purpose described.

The apparatus is portable, and in the preferred form here shown, it is suspended across the top of the open pit, between the two flanges P' of the plates P. For this suspension I provide an adjustable frame comprising two slidable sections made up of parallel bars and designated respectively 1, 1, and 2, 2, which are slidable in the loops or sleeves 3, 3, to increase or diminish the length of the adjustable frame, and set bolts 4 are mounted in the sleeves to hold the sections in fixed, adjusted positions.

At their ends, these sections are provided with hooks 5 adapted to overhang the flange P' as shown in Figures 1 and 2, and the left hand operating motor L and the right hand operating motor R are bolted to the bars at the ends of the frame to make a rigid structure of the frame.

Each operating motor is provided with a saddle 6 having a central stud 7 and end flanges 8, and a rocking beam 9, having holes near its ends that fit over the studs 7, is supported on the saddles, between the flanges 8, 8, as indicated in Figure 1. The rocking beam, at its opposite ends has mounted thereon two manually operated screw jacks 10, 10, which include screws 11 that are turned by use of the pins 12, and each screw has mounted thereon a stirrup 13 adapted to contact beneath the bars of the frame F. Thus, when the rocking beam 9 is supported in horizontal position on the saddles of the two operating motors L and R, the handle bars 12 of the screw jacks may be manipulated to elevate the frame F and thereby relieve the springs and wheels from the weight of the car body and frame. After the weight or load has thus been transferred to the rocking beam, the opposite ends of the beam are alternately lifted and lowered, through the action of the two operating motors L and R, to impart the swaying or rocking motion to the car body and frame.

The two motors R and L are of the reciprocating type and each includes a vertically arranged cylinder 14 in which the piston 15 reciprocates, and the saddles of the motors are mounted at the outer ends of the stems 16 of the pistons, in order that when motive fluid, as compressed air, is admitted beneath the piston 15, the latter is lifted, while motive fluid is vented from beneath the other piston or cylinder, to permit the second piston to descend.

In the control of the motive fluid I employ a distributing valve, indicated as a whole by the numeral 17 in Figures 5 and 6. This valve device has a casing 18 and inlet port 19 to which the pipe 20 is connected to supply the motive fluid as air, and in addition, the casing is provided with two main ports 21 and 22 at opposite sides thereof, and a third port 23. The main ports 21 and 22 are connected by air pipes 24 and 25 respectively to the motor L and motor R, and the venting port 23 has a vent pipe 26 connected thereto, which is equipped with a vent valve 27, the latter valve being employed to adjust the venting action from the cylinders of the motors, below their pistons.

In Figure 5, it will be seen that motive fluid from the supply pipe 20 is passing to the motor L and motive fluid is being vented or exhausted from below, the piston of motor R.

As best seen in Figure 4 a 3-way valve 28 is journaled in the casing 18 to rock on its axis, and this valve is provided with three ports 29, 30, and 31, of which the angular port 29 is adapted to register with the supply port and the two main ports of the casing; the straight-away port 30 is adapted to register with the main ports and the vent port of the casing, and the radial port 31 is a vent port for the motor L.

The oscillating valve 28 is adapted to be rocked or turned through the instrumentality of a valve lever 32, fixed on one end of the journal pin or shaft 33 of the valve, the shaft being journaled in suitable bearings of the valve casing 18. The free end of the lever is connected by a pair of links 34 to the head 35 that is fixed at one end of the rod 36 of the piston 37 reciprocable in the power cylinder 38 of the servo-motor, and this servo-motor, as shown, is located intermediate the two operating motors L and R, and adjacent to the distributing valve 18, both the servo-motor and the distributing valve being supported on the adjustable suspending frame of the apparatus. Thus, it will be obvious that as the piston 37 reciprocates in its cylinder 38 under motive fluid pressure, the valve lever and valve are oscillated, and the ports of the oscillating valve alternately register with, or open and close, the ports of the valve casing for the purpose described.

At opposite ends of the power cylinder 38, and of course at opposite sides of the piston 37, pipes 39 and 40 are connected, and the outer ends of these pipes are connected with the motor L and the motor R respectively, to establish communication between the lower ends of the cylinders 14 and the cylinder 38. The two pipes communicate with the interiors of the cylinders 14 through the instrumentality of two spaced ports 41 and 42, one of these ports, as 42 being located at the bottom of the cylinder below the clearance space beneath the reciprocable piston 15, as best indicated in Figure 7.

Between the two spaced, horizontally disposed ports 41 and 42 a valve chamber 43 is located, the upper end of which is closed by means of a screw plug 44, and a vertically reciprocal valve 45, in the chamber, controls flow of air from the cylinder through the ports 42 and 41, for venting the cylinder below its piston, and establishing communication with the servo-motor.

A spring 46 below the valve tends to lift it to closed position to cut off communication between the ports 42 and 41, and the valve is pushed, or depressed to open position, against the tension of the spring to establish venting communication from the cylinder to the servo-motor.

Thus, as indicated by the two sets of arrows in Figure 6, the motor L is being vented to the atmosphere through pipe 24, and some of the pressure from the motor-cylinder of L has passed through, or is about to pass through pipe 39 to the servo-motor.

Each of the motors L and R is provided with one of these auxiliary valves 45, and they are alternately operated by the ascending movement of the pistons in the motors L and R.

On the top of each cylinder 14 is a valve lever 47 pivotally mounted at 48, and one end of this lever bears down upon the upper end of a valve pin 49 which is vertically reciprocable in a bearing 50 exterior of the cylinder 14 and also reciprocable in the screw plug 44 having ports 44' for use with the auxiliary valve 45. At its lower end the valve pin is rigidly connected with the valve 45, and the valve contacts with a rubber gasket 45' fixed at the bottom of the plug 44, so that when the lever, or rocker arm 47, is tilted on its pivot, the valve is depressed to open position.

The rocker arm 47 is retained by means of a spring latch 51, which is pivoted at 52 at the exterior top of the cylinder 14, and a spring 53 coiled about the pivot 52 and bearing on the top of the latch tends to depress the free end of the latch so that the latter engages on top of the adjoining end of the rocker arm and holds the arm in horizontal position. A tappet pin 54 is loosely connected to the pivoted latch, and this pin extends down through an opening in the upper head of the cylinder 14 to a predetermined distance within the cylinder and in the path of the upwardly moving piston 15 of the cylinder. It will be understood that the rocker arm 47 can never travel beyond the end of the lug on the end of the spring latch 51, because rocker arm 47 is limited in its movement by valve rod 49, which, in turn, is limited by the socket into which spring 46 fits. The lug must be longer than the movement of the lever 47.

A spring 55 is also attached at one end to the under face of the rocker arm, and this spring also extends down through an opening in the head of the cylinder, in the path of movement of the ascending piston 15. A small spring 55' may be employed under the lever 47 and resting on the top of the cylinder head, to act as a cushion spring for the lever. As indicated in Figures 5 and 6, the spring 55 projects downwardly into the cylinder a greater distance than the tappet pin 54. Therefore, as the piston ascends it first contacts with the lower end of the spring 55. The coiled spring 53 is stronger than the compressed spring 55, and consequently spring 53, through the latch, holds the rocker arm in horizontal position while the spring 55 is being compressed. Then, as the piston continues to ascend and contacts with the lower end of the tappet pin 54, the latch 51 is positively lifted, releasing the rocker arm. The compressed spring 55 now lifts one end of the rocker arm while the latter is still under control of the latch 51, with a snapping movement, and consequently the projecting end of the rocker arm is depressed to depress the valve pin 49 and open the valve 45. The opening of the valve 45 near the end of the upper or working stroke of the piston 15, permits a blast of the motive fluid, as compressed air, from the cylinder 14 to the servo-motor, and the latter in Figure 5 pulls the valve lever 32 to the right.

It will be understood that the initial blast of air released by the tripping of the valve stem 49 and the opening of the valve 45 only frees a small portion of the highly compressed air under the piston 15. This accomplishes an aligning of the ports 21 and 31 of the casing 18 and the oscillating valve 28 respectively in order that the residue air within the piston 14 may bleed through the vent 26 and the vent valve 27 in such a manner as to slowly lower the receding piston.

In Figure 6 a similar blast of air from the motor R pushes the valve lever to the left, thus reversing the flow of the circulation with the motive fluid and the distributing valve. Thus, it will be apparent, the left and right hand motors are alternately served with air from the supply pipe 20, and a reciprocating action is accomplished to impart a rocking motion to the vehicle.

The supply of air to the distributing valve is controlled by a manually operated, cut off valve 56, in Figure 2, and when this valve is opened to admit air pressure to the distributing valve, the apparatus is automatically operated as hereinbefore described, to rock or sway the vehicle.

By the operation of the machine, the car is rocked while supported on the frame F, and motion is imparted to the car which closely resembles the movement of vibration of a traveling car as it moves over a rough surface, and it will be apparent that shackle bolts, spring leaves, and other parts of the car are thus subjected to substantially the same movements that would be imparted thereto by a travelling car.

The lifting movement of the operating motors it will be understood is only a slight movement, but the continuation of the movements at alternate sides of the car is sufficient to flex the springs S, and during this flexing movement the spray gun is employed to inject a lubricant between the leaves of the springs. The same facility of lubrication is attained at other greasing points where there are relatively movable parts, and the time required for the greasing operations, as well as the labor required, are thus reduced.

Having thus fully described my invention, what I claim as new and desire to secure by Letters Patent is:—

In rocking mechanism as described, the combination with a pair of spaced operating motors each having a lifting member, of a distributing valve device having a three-way valve therein and communicating with said motors, a servo-motor communicating with said motors and auxiliary valves controlling said communication, operating means for said auxiliary valves comprising a spring actuated rocker arm, a spring latch for said arm and a pin on said latch in the path of movement of a lifting member, and means operated by the servo-motor for reversing the position of the three-way valve.

CLAUDE C. CALKINS.